(12) United States Patent
Song et al.

(10) Patent No.: US 12,528,187 B2
(45) Date of Patent: Jan. 20, 2026

(54) METHOD FOR PLANNING A MOVEMENT PATH FOR A ROBOTIC ARM

(71) Applicant: National Yang Ming Chiao Tung University, Hsinchu (TW)

(72) Inventors: Kai-Tai Song, New Taipei (TW); Shih-Wei Chiu, New Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 172 days.

(21) Appl. No.: 18/627,893

(22) Filed: Apr. 5, 2024

(65) Prior Publication Data

US 2025/0170717 A1 May 29, 2025

(30) Foreign Application Priority Data

Nov. 27, 2023 (TW) .................................. 112145825

(51) Int. Cl.
*B25J 9/16* (2006.01)
*B25J 13/08* (2006.01)

(52) U.S. Cl.
CPC .......... *B25J 9/1664* (2013.01); *B25J 9/1697* (2013.01); *B25J 13/08* (2013.01)

(58) Field of Classification Search
CPC .......... B25J 9/1664; B25J 9/1602; B25J 9/16; B25J 9/1656; B25J 9/1671; B25J 9/1605; B25J 9/1689; B25J 13/08; B25J 9/1697; G06T 7/80; G06T 19/006; G06F 3/017; G06F 3/011; G06F 3/01
See application file for complete search history.

(56) References Cited

U.S. PATENT DOCUMENTS

| 11,331,803 | B2 * | 5/2022 | Bank ........................ B25J 13/08 |
| 2017/0372139 | A1 * | 12/2017 | Thomasson ............ G06V 20/20 |
| 2021/0023694 | A1 * | 1/2021 | Chen ...................... B25J 9/0081 |
| 2021/0094180 | A1 * | 4/2021 | Szafir ................... G05D 1/0016 |

(Continued)

FOREIGN PATENT DOCUMENTS

| TW | I756191 B | 3/2022 |
| WO | 2019217885 A1 | 11/2019 |

OTHER PUBLICATIONS

M. Ostanin, A. Klimchik, Interactive Robot Programing Using Mixed Reality, IFAC-PapersOnLine, vol. 51, Issue 22, 2018, pp. 50-55, ISSN 2405-8963, https://doi.org/10.1016/j.ifacol.2018.11.517. (Year: 2018).*

(Continued)

*Primary Examiner* — Adam R Mott
*Assistant Examiner* — James Miller Watts, III
(74) *Attorney, Agent, or Firm* — Panitch Schwarze Belisario & Nadel LLP

(57) ABSTRACT

A method is provided for planning a movement path for a non-fixed end of a robotic arm. A mixed reality (MR) device is used to capture hand images of a user to obtain multiple target coordinate sets in an MR coordinate system. A computer device is used to convert the target coordinate sets into multiple path coordinate sets in a robot base coordinate system, and controls the non-fixed end of a robotic arm to move along a movement path as indicated by the path coordinate sets. A camera device is used to capture images of a base that the robotic arm is fixed to for conversion of the target coordinate sets into the path coordinate sets.

12 Claims, 15 Drawing Sheets

(56) References Cited

U.S. PATENT DOCUMENTS

2023/0330847 A1* 10/2023 Schoenborn ........... B25J 9/1656
2024/0050156 A1*  2/2024 VanDyken ............. A61B 34/30

OTHER PUBLICATIONS

J.W.S. Chong, S.K. Ong, A.Y.C. Nee, K. Youcef-Youmi, Robot programming using augmented reality: An interactive method for planning collision-free paths, Robotics and Computer-Integrated Manufacturing, vol. 25, Issue 3, 2009, pp. 689-701, ISSN 0736-5845, https://doi.org/10.1016/j.rcim.2008.05.002. (Year: 2009).*

Fang, H., Ong, S., and Nee, A. (2012). Robot Path and End-Effector Orientation Planning Using Augmented Reality. Procedia CIRP, 3, 191-196. (Year: 2012).*

K.-T. Song and S.-W. Chiu, "Mixed Reality Robot Programming Using Hand Gestures," 2024 International Conference on Advanced Robotics and Intelligent Systems (ARIS), Taipei, Taiwan, 2024, pp. 1-6, doi: 10.1109/ARIS62416.2024.10680008. (Year: 2024).*

Inês Soares, et al., "Programming Robots by Demonstration Using Augmented Reality," Sensors, vol. 21, No. 17:5976, (2021) (Year : 2021).*

Inês Soares, et al., "Programming Robots by Demonstration Using Augmented Reality," Sensors, vol. 21, No. 17:5976, (2021).

Camilo Perez Quintero, et al., "Robot Programming Through Augmented Trajectories in Augmented Reality," 2018 IEEE/RSJ International Conference on Intelligent Robots and Systems (IROS), Madrid, Spain, Oct. 1-5, 2018, pp. 1838-1844.

Thomas Groechel, et al., "Kinesthetic Curiosity: Towards Personalized Embodied Learning with a Robot Tutor Teaching Programming in Mixed Reality," in Proc. Experimental Robotics: The 17th International Symposium, Springer International Publishing, vol. 19, 2021, pp. 245-252.

* cited by examiner

METHOD FOR PLANNING A MOVEMENT PATH FOR A ROBOTIC ARM

CROSS-REFERENCE TO RELATED APPLICATION

This application claims priority to Taiwanese Invention Patent Application No. 112145825, filed on Nov. 27, 2023, and the entire disclosure of which is incorporated by reference herein.

FIELD

The disclosure relates to a method for planning a movement path for a robotic arm, and more particularly to a method for generating an operation instruction that indicates a movement path for a robotic arm.

BACKGROUND

Traditionally, operation of a robotic arm requires manual configuration by trained professionals or development of program by skilled personnel to generate instructions for controlling the robotic arm. Consequently, ordinary individuals need to undergo extensive training to learn manual configuration or programming, which is time-consuming and demands a significant allocation of human resources.

SUMMARY

Therefore, an object of the disclosure is to provide a method that can alleviate at least one of the drawbacks of the prior art.

According to the disclosure, the method is provided for planning a movement path for a non-fixed end of a robotic arm. The robotic arm has a fixed end that is opposite to the non-fixed end and that is fixed to a base. A robotic arm control system is provided to be communicatively connected to a camera device which is configured to capture images of the base. The robotic arm control system includes a mixed reality (MR) device that is to be worn on a user, and a computer device that is communicatively connected to the robotic arm and the MR device, and that stores a first transformation matrix and a second transformation matrix. The first transformation matrix is used to perform coordinate transformation from a robot base coordinate system related to the fixed end of the robotic arm to a navigation coordinate system related to the camera device. The second transformation matrix is used to perform coordinate transformation from the navigation coordinate system to an MR coordinate system related to the MR device. In step (A), the MR device captures a target-setting hand image that is related to a hand of the user, and obtains a target coordinate set in the MR coordinate system based on the target-setting hand image, where the target coordinate set is related to the hand of the user. In step (B), the MR device determines whether an instruction for terminating path planning is received. In step (C), the MR device repeats step (A) upon determining that the instruction for terminating path planning has not been received yet. In step (D), after determining that the instruction for terminating path planning is received, the MR device generates and sends an execution request to the computer device, where the execution request includes the target coordinate sets that are obtained respectively in multiple executions of step (A) and that are arranged in a user-defined order. In step (E), upon receipt of the execution request, the computer device converts, based on the first transformation matrix and the second transformation matrix, the target coordinate sets in the MR coordinate system respectively to path coordinate sets in the robot base coordinate system. The path coordinate sets are arranged in the user-defined order and cooperatively indicating a movement path. In step (F), the computer device controls the non-fixed end of the robotic arm to move along the movement path by generating and sending to the robotic arm an operating instruction that includes the path coordinate sets.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
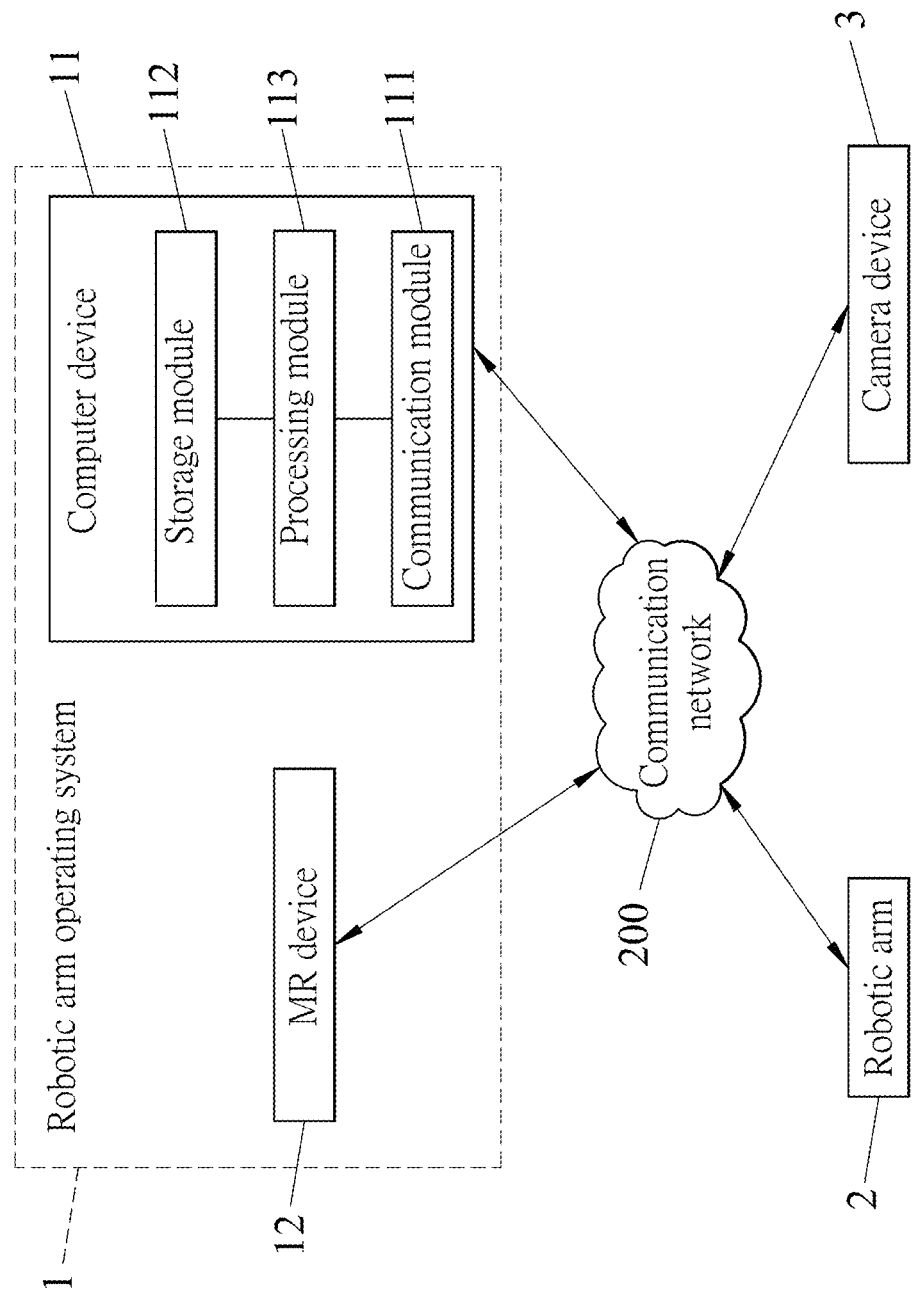
FIG. 1 is a block diagram illustrating an embodiment of a robotic arm operating system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
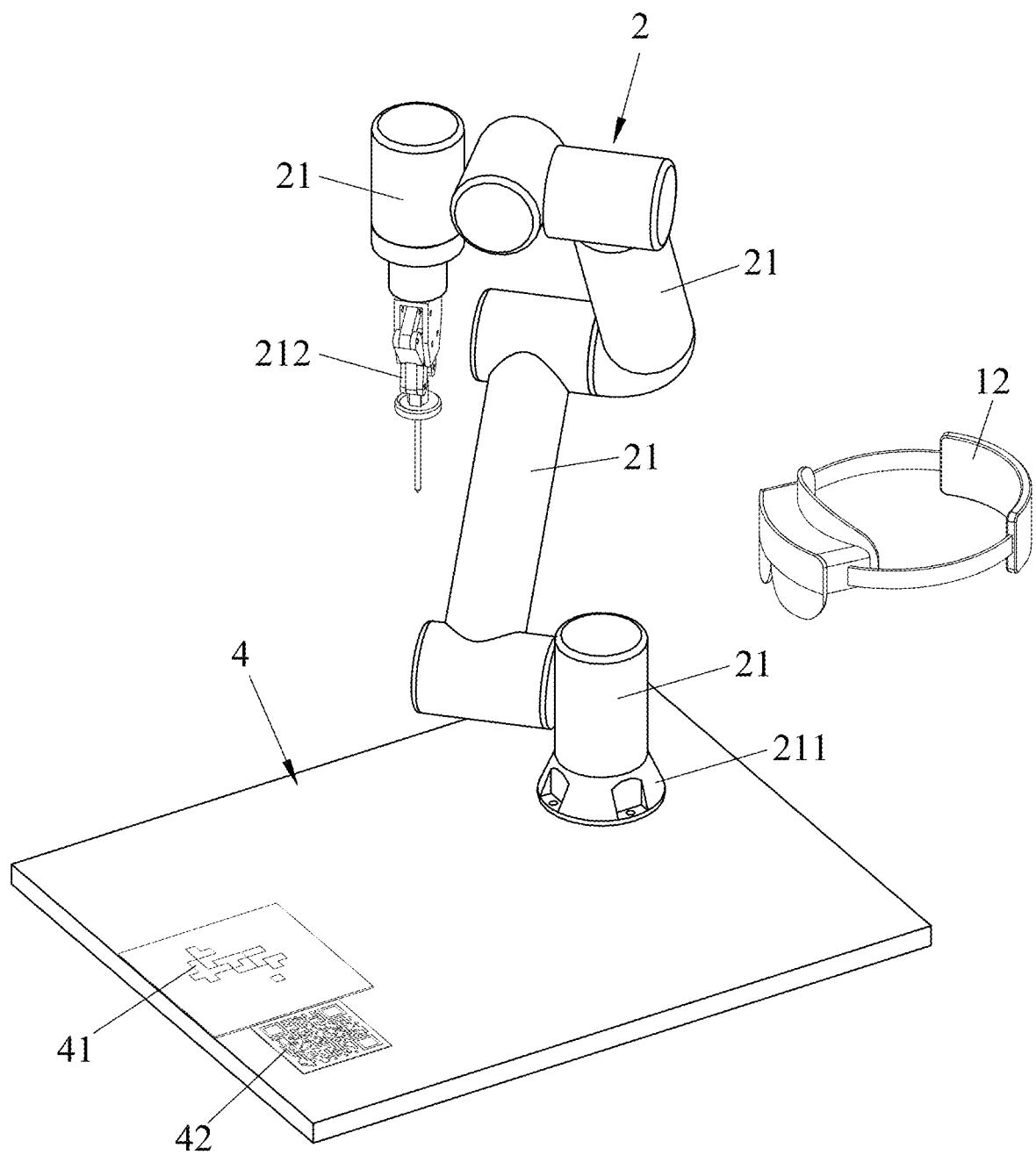
FIG. 2 is a perspective view illustrating a robotic arm and a mixed reality (MR) device used in the embodiment.

Referring to FIGS. 1 and 2, an embodiment of a robotic arm operating system 1 according to this disclosure is shown to be communicatively connected to a robotic arm 2 and a camera device 3, where the camera device 3 is separated from the robotic arm operating system 1 and the robotic arm 2. The robotic arm operating system 1 may communicate with the robotic arm 2 and the camera device 3 through a communication network 200 (e.g., the Internet, a local area network, etc.) that employs wireless communications or wired connections. The robotic arm 2 has a fixed end 211 fixed to a base 4, and a non-fixed end 212 (or free end) opposite to the fixed end 211. In this embodiment, the robotic arm 2 is implemented using a TM5-900 six-axis robotic arm, but this disclosure is not limited to such The robotic arm operating system 1 includes a wearable MR (mixed reality) device 12, and a computer device 11 that is communicatively connected to the robotic arm 2, the MR device 12 and the camera device 3. In this embodiment, the computer device 11 is in wired connection with the robotic arm 2 for controlling the motion of the robotic arm 2, but this disclosure is not limited in this respect. In this embodiment, the MR device 12 is implemented using a Microsoft HoloLens® 2, but this disclosure is not limited to such.

The computer device 11 includes a communication module 111 that is communicatively connected to the camera device 3 and the MR device 12, a storage module 112, and a processing module 113 that is electrically connected to the communication module 111 and the storage module 112. The communication module 111 may use, for example, Wi-Fi, 5G, etc., to realize wireless communication, and this disclosure is not limited to such. The storage module 112 may be realized using, for example, flash memory, a hard disk drive, a solid state drive, etc., and this disclosure is not limited to such. The processing module 113 may be realized using, for example, one or more single-core or multi-core processors, and this disclosure is not limited to such. In this embodiment, the computer device 11 is implemented using an Advantech MIC-770Q-BTO industrial computer, but this disclosure is not limited to such.

The robotic arm 2 includes a plurality of links 21 that are, for example, rotatably connected to one another. One of the links 21 has the fixed end 211 of the robotic arm 2, and another link 21 has the non-fixed end 212 of the robotic arm 2.

The camera device 3 is disposed to continuously capture images of a first positioning label 41 and a second positioning label 42, and send the images to the computer device 11, where the first positioning label 41 is attached to the base 4, and the second positioning label 42 is disposed to be captured by both the camera device 3 and the MR device 12. The second positioning label 42 is attached to the base 4 in this embodiment, but may be attached to another object (e.g., a table, a wall, etc.) that is disposed in the same space as the camera device 3 and the MR device 12. In this embodiment, the camera device 3 is a depth camera (e.g., Intel® RealSense™ D435) used for navigation, the first positioning label 41 is an AprilTag that serves as a base marker, and the second positioning label 42 is a quick response (QR) code that serves as a dynamic reference frame, but this disclosure is not limited to such.

Figure 10:
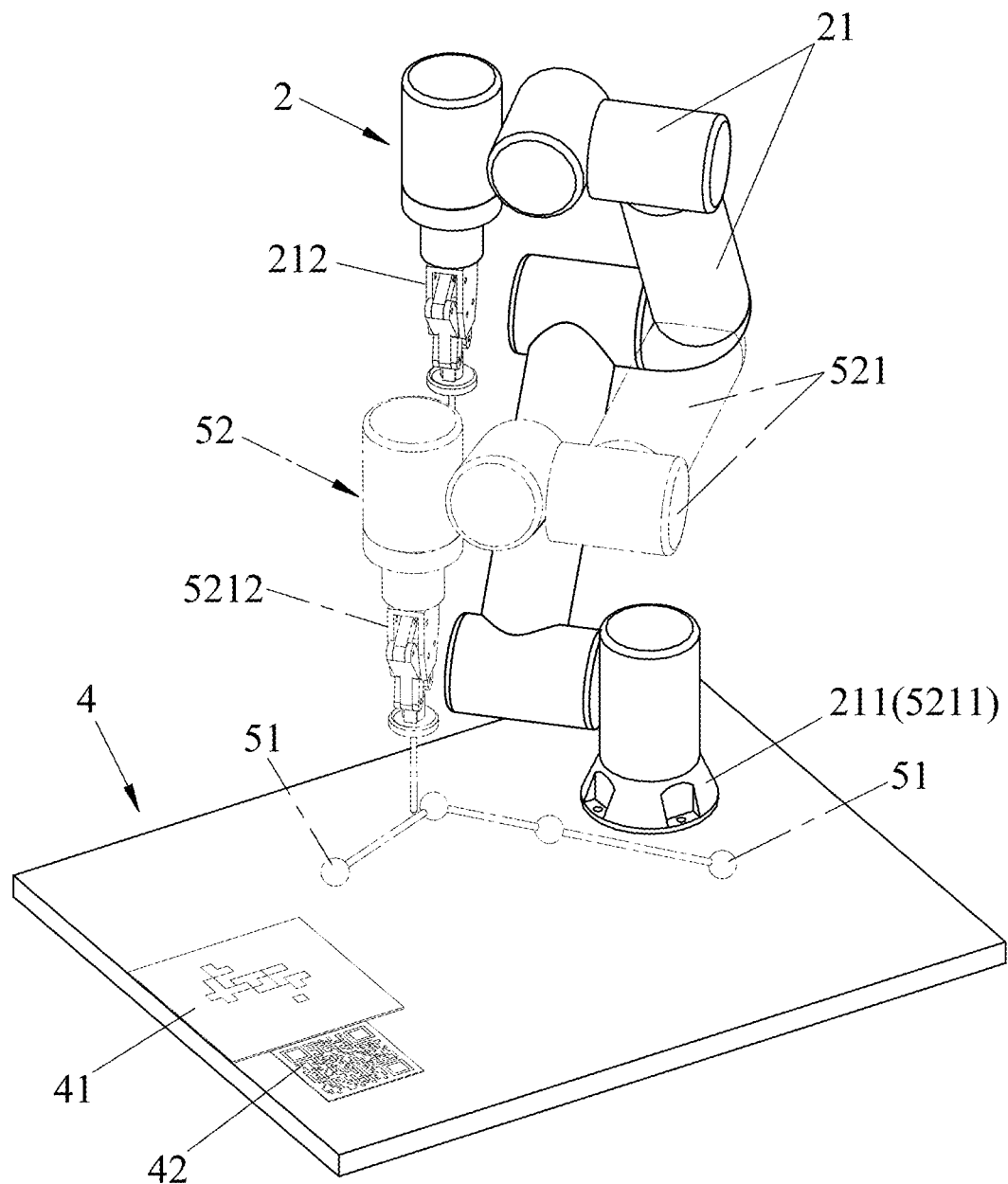
FIG. 10 is a perspective view illustrating a mixed reality scene that contains a virtual robotic arm in a virtual space aligning with the robotic arm in the real world, and multiple virtual three-dimensional (3D) objects generated according to the embodiment of the method.

The storage module 112 is used to store a first transformation matrix $T_{RBCS}^{NCS}$, a second transformation matrix $T_{NCS}^{MRCS}$, a third transformation matrix $T_{RBCS}^{BMCS}$, a world coordinate system (WCS), a virtual 3D object 51 (see FIG. 10), and a virtual robotic arm 52 (see FIG. 10). The first transformation matrix $T_{RBCS}^{NCS}$ is used to perform coordinate transformation (i.e., transforming a coordinate set in one coordinate system to a coordinate set in another coordinate system) from a robot base coordinate system (RBCS) related to the fixed end 211 of the robotic arm 2 to a navigation coordinate system (NCS) related to the camera device 3. The second transformation matrix $T_{NCS}^{MRCS}$ is used to perform coordinate transformation from the navigation coordinate system to an MR coordinate system (MRCS) related to the MR device 12. The third transformation matrix $TRs^{BB}S$ is used to perform coordinate transformation from the robot base coordinate system to a first positioning coordinate system (e.g., a base marker coordinate system (BMCS) in this embodiment) defined by the first positioning label 41. The world coordinate system is generated by the MR device 12 based on an environmental image data piece that is obtained by the MR device 12 capturing images of a surrounding environment when turned on. The techniques used to establish the world coordinate system should be known to one having ordinary skill in the art, so details thereof are omitted herein for the sake of brevity. The virtual robotic arm 52 has the same structure as the robotic arm 2 and is used in a virtual object coordinate system to simulate motion of the robotic arm 2 based on a joint angle data piece. In detail, the virtual robotic arm 52 includes a plurality of virtual links 521 (see FIG. 10). One of the virtual links 521 includes a virtual fixed end 5211 of the virtual robotic arm 52 that corresponds to a central point of the fixed end 211 of the robotic arm 2 and that is located at a base point coordinate set in the virtual object coordinate system, where the base point coordinate set is a coordinate set of an origin in the virtual object coordinate system. Another virtual link 521 includes a virtual non-fixed end (or virtual free end) 5212 (see FIG. 10) of the virtual robotic arm 52 that corresponds to the non-fixed end 212 of the robotic arm 2 and that is opposite to the virtual fixed end 5211.

Interactions among the robotic arm operating system 1, the robotic arm 2 and the camera device 3 will be described in connection with an embodiment of a method for planning a movement path for the non-fixed end 212 of the robotic arm 2 and for generating a corresponding operating instruction to control the robotic arm 2 to move the non-fixed end 212 along the planned movement path according to this disclosure. The method includes a coordinate generation procedure for generating one or more target coordinate sets, a simulation procedure for causing the virtual robotic arm 52 to move along a simulation path, and an execution procedure for controlling the robotic arm 2 to move along the planned movement path.

Figure 3:
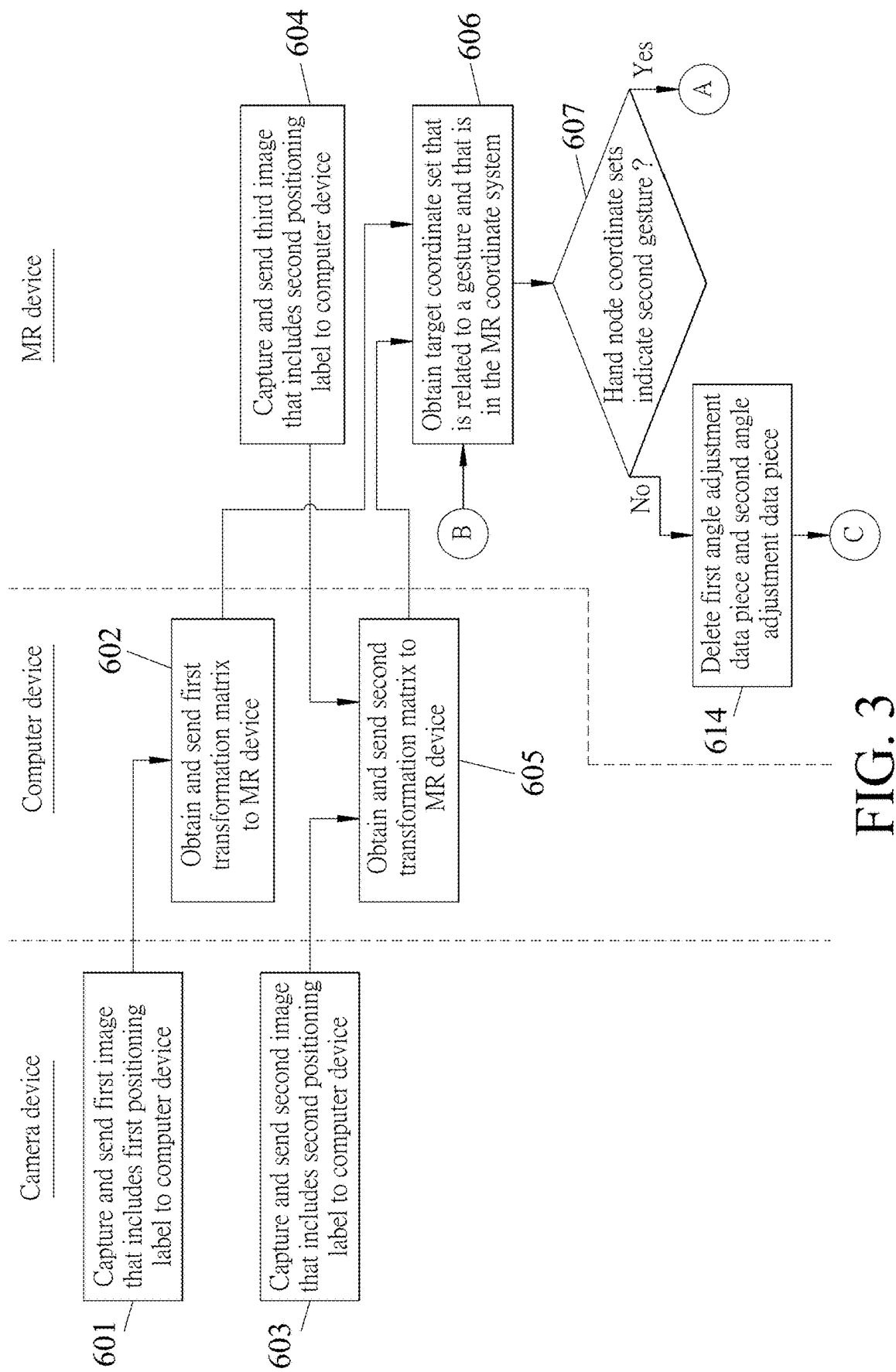
FIGS. 3 to 5 are flow charts illustrating steps of a coordinate generation procedure according to an embodiment of a method for planning a movement path for a robotic arm.
Figure 4:
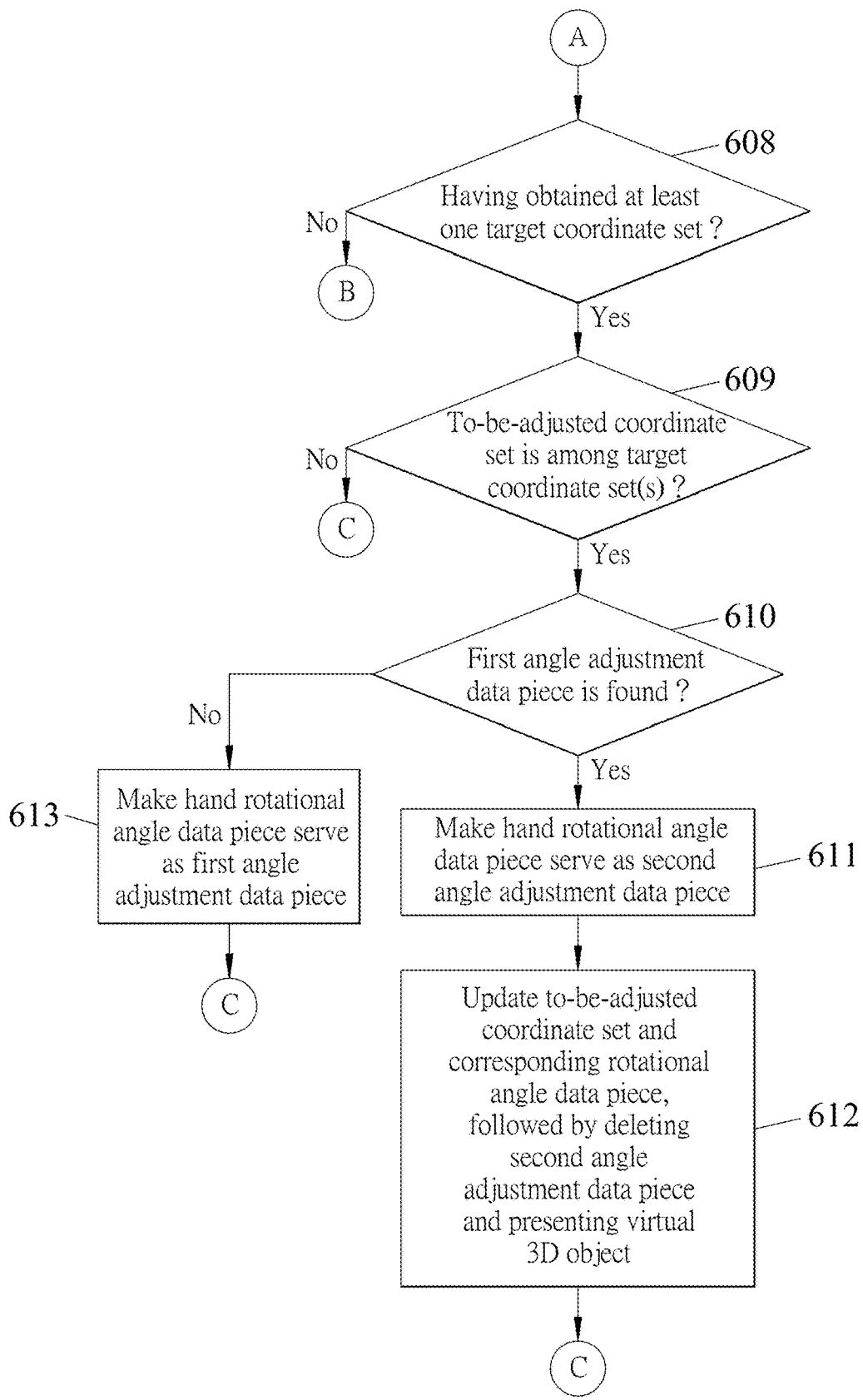
Figure 5:
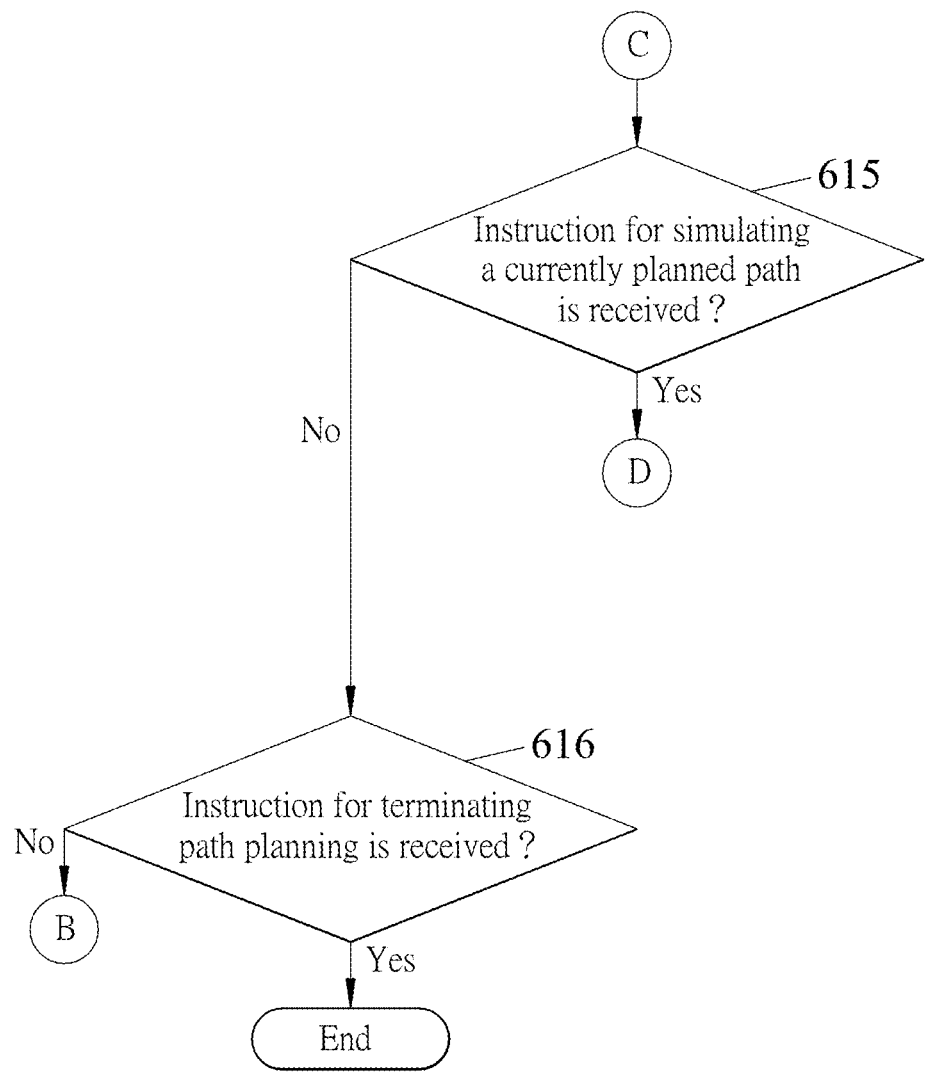

Referring to FIGS. 3 through 5, the coordinate generation procedure includes steps 601 to 616.

In step 601, the camera device 3 captures and sends, to the computer device 11, a first image that includes the first positioning label 41.

In step 602, the processing module 113 receives the first image from the camera device 3, obtains the first transformation matrix $T_{RBCS}^{NCS}$ based on the first image and the third transformation matrix $T_{RBCS}^{BMCS}$, and sends the first transformation matrix $T_{RBCS}^{NCS}$ to the MR device 12.

Figure 6:
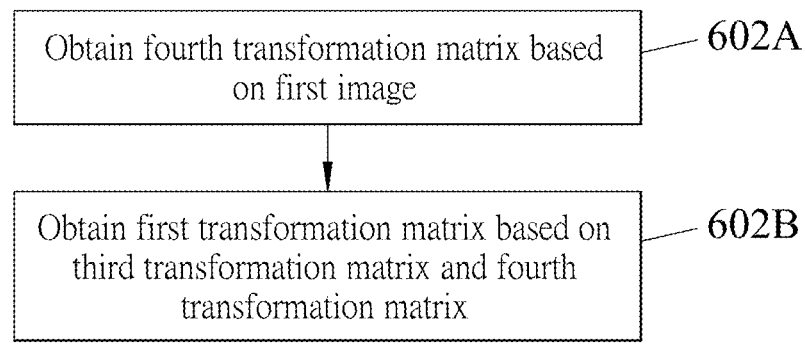
FIG. 6 is a flow chart illustrating steps for obtaining a first transformation matrix according to the embodiment of the method.

Further referring to FIG. 6, step 602 includes sub-steps 602A and 602B.

In sub-step 602A, the processing module 113 receives the first image through the communication module 111, and obtains a label-based transformation matrix (referred to as "fourth transformation matrix" hereinafter) $T_{BMCS}^{NCS}$ using a first positioning algorithm based on a first-positioning-label region in the first image. The first-positioning-label region is a region in the first image that is related to the first positioning label 41 (e.g., the first positioning label 41 shown in the first image). The fourth transformation matrix $T_{BMCS}^{NCS}$ is used to perform coordinate transformation from the first positioning coordinate system to the navigation coordinate system. In this embodiment, the first positioning algorithm is to solve a perspective-n-point (PnP) problem using the camera device 3 and the first positioning label 41, which should be familiar to one having ordinary skill in the art, so details thereof are omitted herein for the sake of brevity.

In sub-step 602B, the processing module 113 obtains the first transformation matrix $T_{RBCS}^{NCS}$ based on the third transformation matrix $T_{RBCS}^{BMCS}$ and the fourth transformation matrix $T_{BMCS}^{NCS}$, and sends the first transformation matrix $T_{RBCS}^{NCS}$ to the MR device 12 through the communication module 111. The first transformation matrix $T_{RBCS}^{NCS}$ is obtained according to:

$$T_{RBCS}^{NCS} = T_{BMCS}^{NCS} \cdot T_{RBCS}^{BMCS}. \tag{1}$$

It is noted that, traditionally, each time the camera device 3, the robotic arm 2, and the base 4 to which the robotic arm 2 is secured are set up, it is necessary to employ conventional eye-to-hand calibration to obtain the first transformation matrix $T_{RBCS}^{NCS}$. In this embodiment, the eye-to-hand calibration is used to obtain the first transformation matrix $T_{RBCS}^{NCS}$ only for the first time the camera device 3, the robotic arm 2 and the base 4 are set up. After the first transformation matrix $T_{RBCS}^{NCS}$ is obtained, the camera device 3 is used to capture an image that includes the first positioning label 41, and a corresponding fourth transformation matrix $T_{BMCS}^{NCS}$ is thus obtained. Then, the processing module 113 obtains the third transformation matrix $T_{RBCS}^{BMCS}$ based on the first transformation matrix $T_{RBCS}^{NCS}$ and the fourth transformation matrix $T_{BMCS}^{NCS}$, and stores the third transformation matrix $T_{RBCS}^{BMCS}$ in the storage module 112. As a result, when it is needed to reposition the camera device 3, the robotic arm 2 and the base 4 in the future, step 602 can be performed using the pre-stored third transformation matrix $T_{RBCS}^{BMCS}$ and a newly obtained fourth transformation matrix $T_{BMCS}^{NCS}$, thereby quickly obtaining a new first transformation matrix $T_{BMCS}^{NCS}$, without having to perform the eye-to-hand calibration again.

In step 603, the camera device 3 captures and sends, to the computer device 11, a second image that includes the second positioning label 42.

In step 604, the MR device 12 captures and sends, to the computer device 11, a third image that includes the second positioning label 42.

In step 605, the processing module 113 receives the second image and the third image respectively from the camera device 3 and the MR device 12, obtains the second transformation matrix $T_{NCS}^{MRCS}$ based on the second image and the third image, and sends the second transformation matrix $T_{NCS}^{MRCS}$ to the MR device 12 through the communication module 111.

Figure 7:
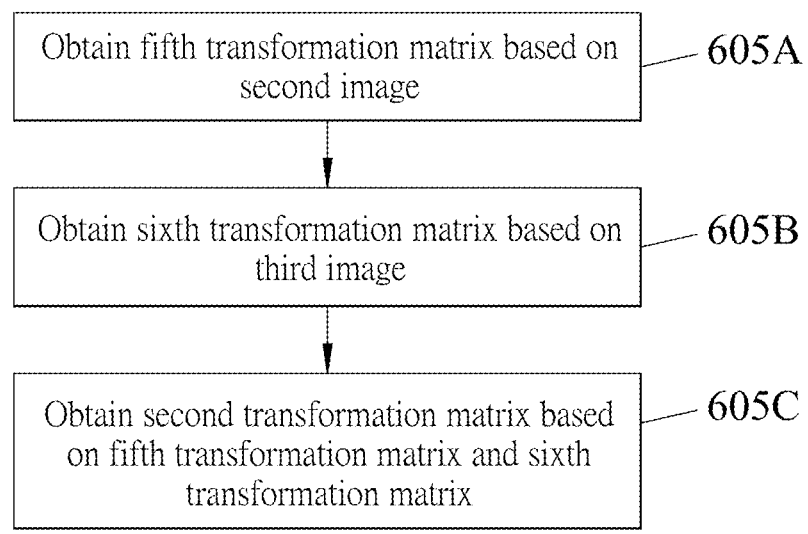
FIG. 7 is a flow chart illustrating steps for obtaining a second transformation matrix according to the embodiment of the method.

Further referring to FIG. 7, step 605 includes sub-steps 605A to 605C.

In sub-step 605A, the processing module 113 receives the second image through the communication module 111, and obtains another label-based transformation matrix (referred to as "fifth transformation matrix" hereinafter) $T_{DRFCS}^{NCS}$ using a second positioning algorithm and based on a second-positioning-label region in the second image. The second-positioning-label region is a region in the first image that is related to the second positioning label 42 (e.g., the second positioning label 42 shown in the second image). The fifth transformation matrix $T_{DRFCS}^{NCS}$ is used to perform coordinate transformation from a second positioning coordinate system (e.g., a dynamic reference frame coordinate system (DRFCS) in this embodiment) that is defined by the second positioning label 42 to the navigation coordinate system. In this embodiment, the second positioning algorithm is to solve a PnP problem using the camera device 3 and the second positioning label 42, which should be familiar to one having ordinary skill in the art, so details thereof are omitted herein for the sake of brevity.

In sub-step 605B, the processing module 113 receives the third image through the communication module 111, and obtains yet another label-based transformation matrix (referred to as "sixth transformation matrix" hereinafter) $T_{DRFCS}^{MRCS}$ using the second positioning algorithm based on another second-positioning-label region in the third image. The another second-positioning-label region is a region in the third image that is related to the second positioning label 42 (e.g., the second positioning label 42 shown in the third image). The sixth transformation matrix $T_{DRFCS}^{MRCS}$ is used to perform coordinate transformation from the second positioning coordinate system to the MR coordinate system.

In sub-step 605C, the processing module 113 obtains the second transformation matrix $T_{NCS}^{MRCS}$ based on the fifth transformation matrix $T_{DRFCS}^{NCS}$ and the sixth transformation matrix $T_{DRFCS}^{MRCS}$, and sends the second transformation matrix $T_{NCS}^{MRCS}$ to the MR device 12. The second transformation matrix $T_{NCS}^{MRCS}$ is obtained according to:

$$T_{NCS}^{MRCS} = T_{DRFCS}^{MRCS} \cdot (T_{DRFCS}^{NCS})^{-1}. \tag{2}$$

In step 606, the MR device 12 obtains a target coordinate set in the MR coordinate system based on a target-setting hand image that is captured by the MR device 12 and that includes a hand of a user, where the target coordinate set is related to a gesture performed by the hand of the user.

Figure 8:
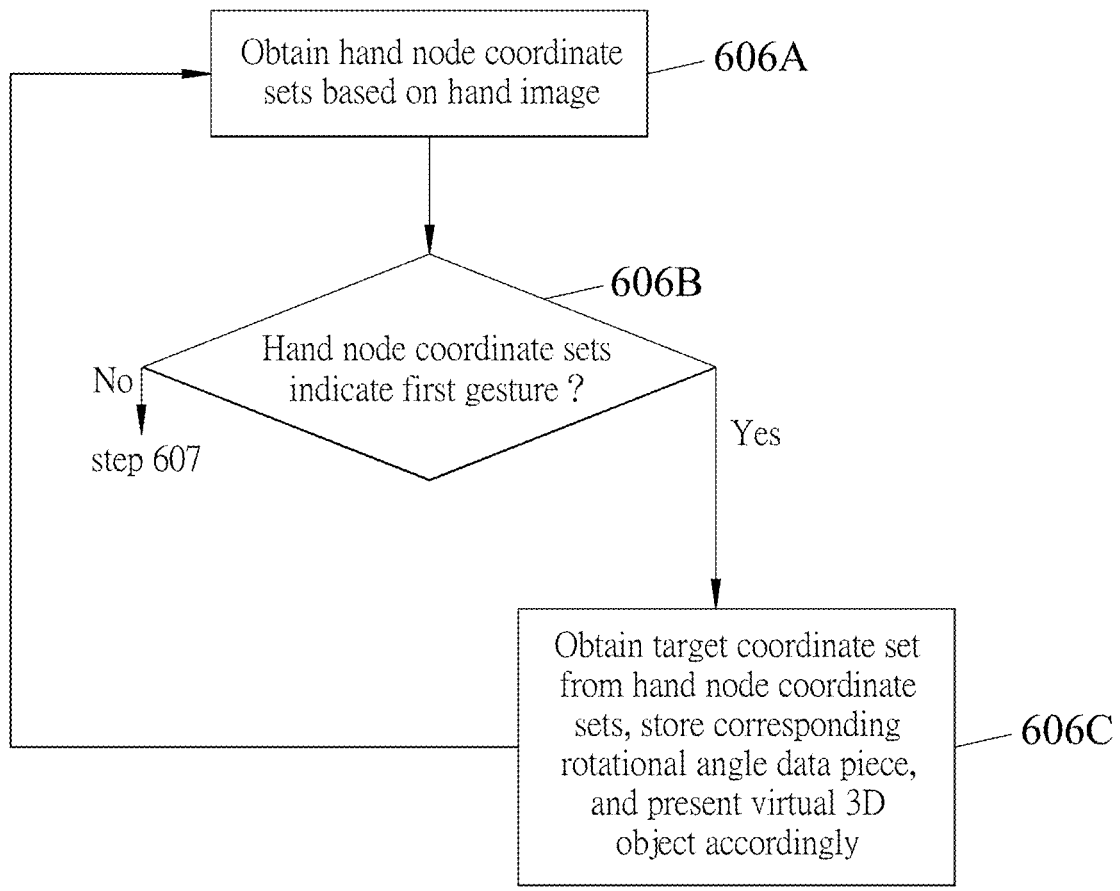
FIG. 8 is a flow chart illustrating steps for obtaining a target coordinate set according to the embodiment of the method.

Further referring to FIG. 8, step 606 includes sub-steps 606A to 606C.

Figure 9:
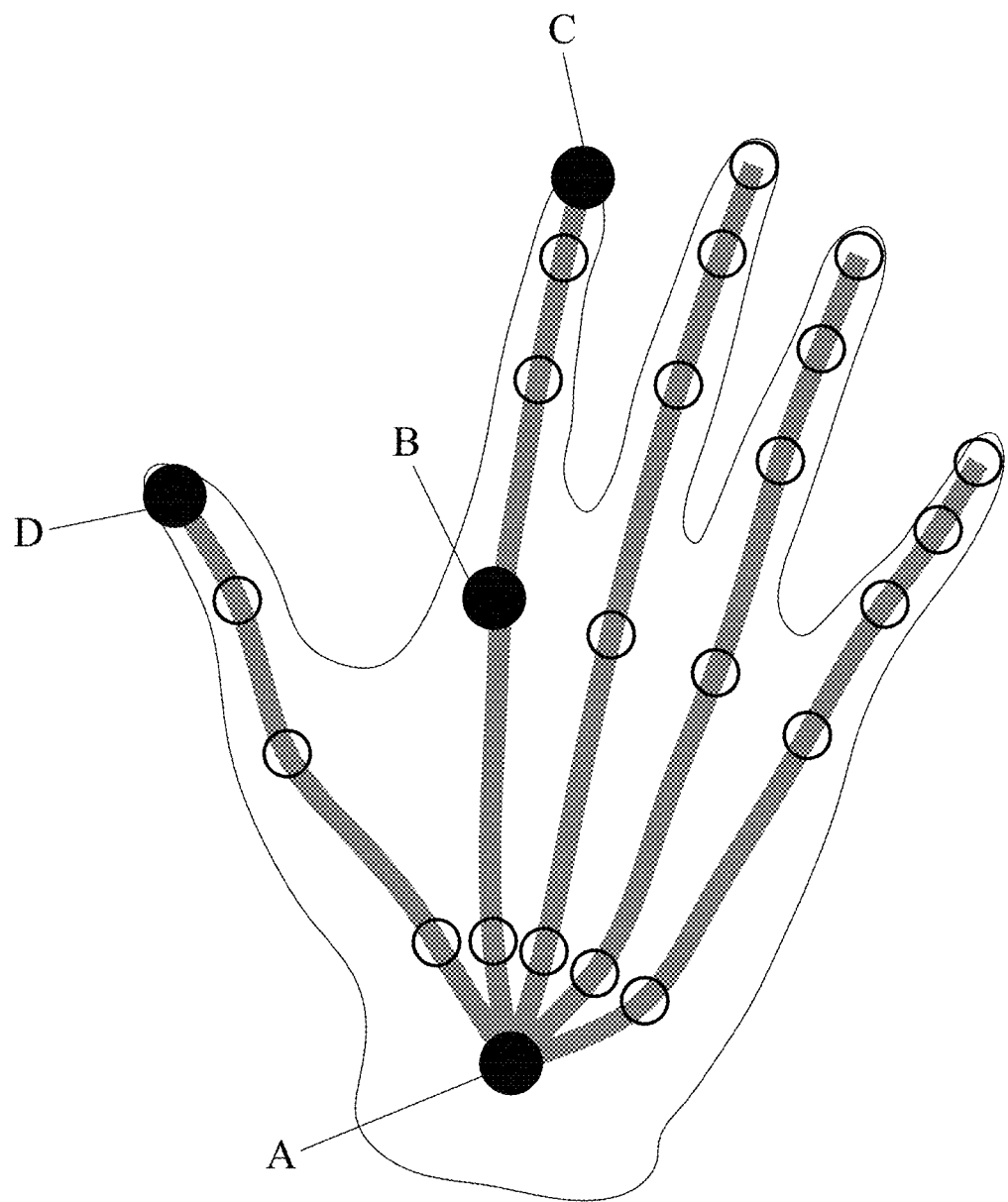
FIG. 9 is a schematic diagram illustrating a plurality of hand node coordinate sets obtained according to the embodiment of the method.

In sub-step 606A, the MR device 12 captures a hand image of the user that includes the hand of the user, and obtains, using a hand tracking algorithm for tracking hand nodes of a hand and based on the hand image, a plurality of hand node coordinate sets in the MR coordinate system, and a hand rotational angle data piece that is related to the hand of the user and that corresponds to the hand node coordinate sets, where the hand node coordinate sets are related to a gesture performed by the hand, and are related respectively to a plurality of hand nodes of the hand, as illustrated in FIG. 9. In this embodiment, the hand node coordinate sets include a first fingertip coordinate set that corresponds to a first fingertip of the hand (e.g., a thumb tip denoted by "D" in FIG. 9), a second fingertip coordinate set that corresponds to a second fingertip of the hand (e.g., an index finger tip denoted by "C" in FIG. 9), a hand joint coordinate set that corresponds to a joint of the hand (e.g., an index knuckle denoted by "B" in FIG. 9), and a wrist joint coordinate set that corresponds to a wrist joint of the hand denoted by "A" in FIG. 9, but this disclosure is not limited to such. In this embodiment, the hand tracking algorithm is implemented using a mixed reality toolkit (MRTK), but this disclosure is not limited to such.

In sub-step 606B, the MR device 12 determines whether a first portion of the hand node coordinate sets indicates a first gesture (e.g., a gesture of pinch). The flow goes to sub-step 606C when the determination is affirmative, and goes to step 607 when otherwise. In this embodiment, the first portion of the hand node coordinate sets includes the first fingertip coordinate set and the second fingertip coordinate set, and the MR device 12 determines whether the first portion of the hand node coordinate sets indicates the first gesture by determining whether a distance between the first fingertip coordinate set and the second fingertip coordinate set is smaller than a first predetermined distance. In this embodiment, when the distance between the first fingertip coordinate set and the second fingertip coordinate set is smaller than the first predetermined distance, the MR device 12 determines that the first portion of the hand node coordinate sets indicates the first gesture. In this embodiment, the first predetermined distance is 0.7 cm, but this disclosure is not limited to such.

In sub-step 606C, the MR device 12 makes the user-hand image serve as the target-setting hand image, acquires the target coordinate set based on the first portion of the hand node coordinate sets, stores a rotational angle data piece that corresponds to the target coordinate set, and presents, based on the target coordinate set and the corresponding rotational angle data piece, the virtual 3D object 51 in a virtual space defined by the MR coordinate system, as illustrated in FIG. 10. Then, the flow goes back to sub-step 606A to deal with the next hand image. In this embodiment, the rotational angle data piece stored in sub-step 606C is related to orientation of the non-fixed end 212 of the robotic arm 2 when the non-fixed end 212 moves to the corresponding target coordinate set in the execution procedure, and includes a pitch angle, a yaw angle and a roll angle with respect to the MR coordinate system, and all these angles are initially set to initial values of zero. In this embodiment, the target coordinate set can be either the first fingertip coordinate set or the second fingertip coordinate set.

In step 607, the MR device 12 determines whether a second portion of the hand node coordinate sets indicates a second gesture (e.g., a gesture of grasp) that is different from the first gesture. The flow goes to step 608 when the determination is affirmative, and goes to step 614 when otherwise. In this embodiment, the second portion of the hand node coordinate sets includes the hand joint coordinate set, the wrist joint coordinate set and the second fingertip coordinate set.

Figure 11:
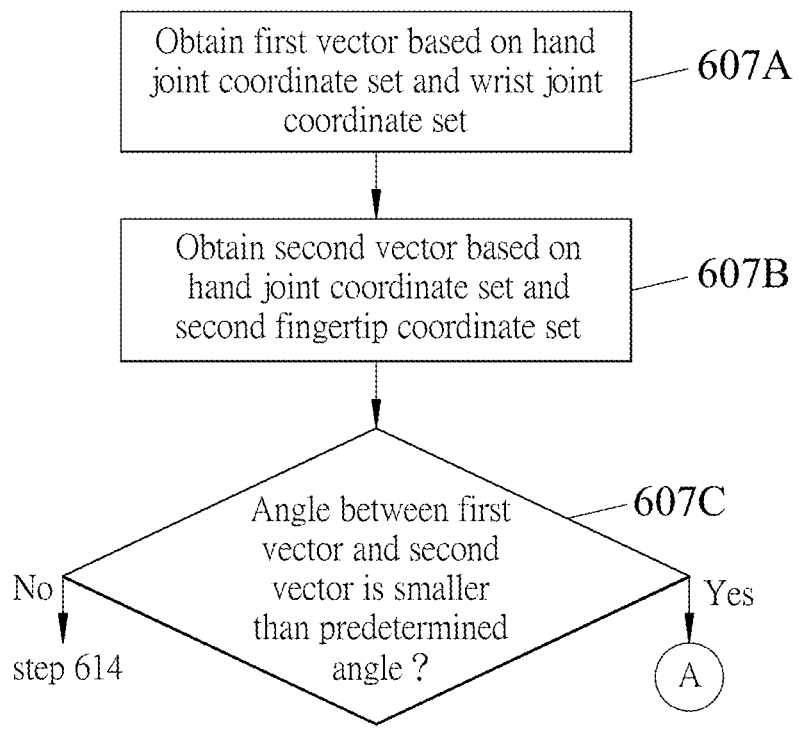
FIG. 11 is a flow chart illustrating steps for determining a second gesture according to the embodiment of the method.

Further referring to FIG. 11, step 607 includes sub-steps 607A to 607C.

In sub-step 607A, the MR device 12 obtains a first vector based on the hand joint coordinate set and the wrist joint coordinate set.

In sub-step 607B, the MR device 12 obtains a second vector based on the hand joint coordinate set and the second fingertip coordinate set.

In sub-step 607C, the MR device 12 determines whether the second portion of the hand node coordinate sets indicates the second gesture by determining whether an angle between the first vector and the second vector is smaller than a predetermined angle. In this embodiment, when the angle between the first vector and the second vector is smaller than the predetermined angle, the MR device 12 determines that the second portion of the hand node coordinate sets indicates the second gesture. In this embodiment, the predetermined angle is 100 degrees, but this disclosure is not limited to such.

In step 608, the MR device 12 determines whether at least one target coordinate set has been obtained thereby. The flow goes to step 609 when the determination is affirmative, and goes back to step 606 to deal with the next hand image when otherwise (i.e., no target coordinate set has been obtained).

In step 609, the MR device 12 determines whether the at least one target coordinate set includes a to-be-adjusted coordinate set (namely, whether a to-be-adjusted coordinate set exists among all of the target coordinate set(s)). A target coordinate set would be determined as being the to-be-adjusted coordinate set when a distance between the target coordinate set and a reference node coordinate set, which is included in the second portion of the hand node coordinate sets, is smaller than a second predetermined distance, and is a minimum of all distance(s), each between the reference node coordinate set and a corresponding one of the at least one target coordinate set. In this embodiment, the reference node coordinate set is the hand joint coordinate set, but this disclosure is not limited to such. The flow goes to step 610 when the determination is affirmative, and goes to step 615 when otherwise.

In step 610, the MR device 12 determines whether a first angle adjustment data piece is found in the MR device 12, where the first angle adjustment data piece is used to update the to-be-adjusted coordinate set. The flow goes to step 611 when the determination is affirmative, and goes to step 613 when otherwise.

In step 611, the MR device 12 makes the hand rotational angle data piece serve as the second angle adjustment data piece.

In step 612, the MR device 12 updates the to-be-adjusted coordinate set based on the reference node coordinate set (e.g., setting to-be-adjusted coordinate set as the reference node coordinate set), and updates the rotational angle data piece that corresponds to the to-be-adjusted coordinate set based on the first angle adjustment data piece and the second angle adjustment data piece, followed by deleting the second angle adjustment data piece. Then, the MR device 12 presents the virtual 3D object 51 in the virtual space based on the to-be-adjusted coordinate set thus updated and the corresponding rotational angle data piece thus updated, and then the flow goes to step 615.

In step 613, the MR device 12 makes the hand rotational angle data piece serve as the first angle adjustment data piece, and then the flow goes to step 615.

In step 614 (see FIG. 3), the MR device 12 deletes the first angle adjustment data piece and the second angle adjustment data piece, and then the flow goes to step 615.

In this embodiment, the MR device 12 is operable to present a virtual setting interface in the virtual space for the user to adjust the rotational angle data piece that corresponds to the to-be-adjusted coordinate set. In detail, the virtual setting interface may show the pitch angle, the yaw angle and the roll angle that correspond to the to-be-adjusted coordinate set, and includes multiple virtual buttons for adjusting these angles. The virtual buttons may include, for example, a pitch increasing virtual button and a pitch decreasing virtual button for increasing and decreasing the pitch angle, a yaw increasing virtual button and a yaw decreasing virtual button for increasing and decreasing the yaw angle, and a roll increasing virtual button and a roll decreasing virtual button for increasing and decreasing the roll angle.

In step 615, the MR device 12 determines whether an instruction for simulating a currently planned path is received thereby. The flow goes to step 706 to perform the simulation procedure when the determination is affirmative, and goes to step 616 when otherwise.

In step 616, the MR device 12 determines whether an instruction for terminating path planning is received thereby. The flow ends and the robotic arm operating system 1 is ready to perform the execution procedure when the determination is affirmative. Otherwise, the flow goes back to step 606 to deal with the next hand image.

Figure 12:
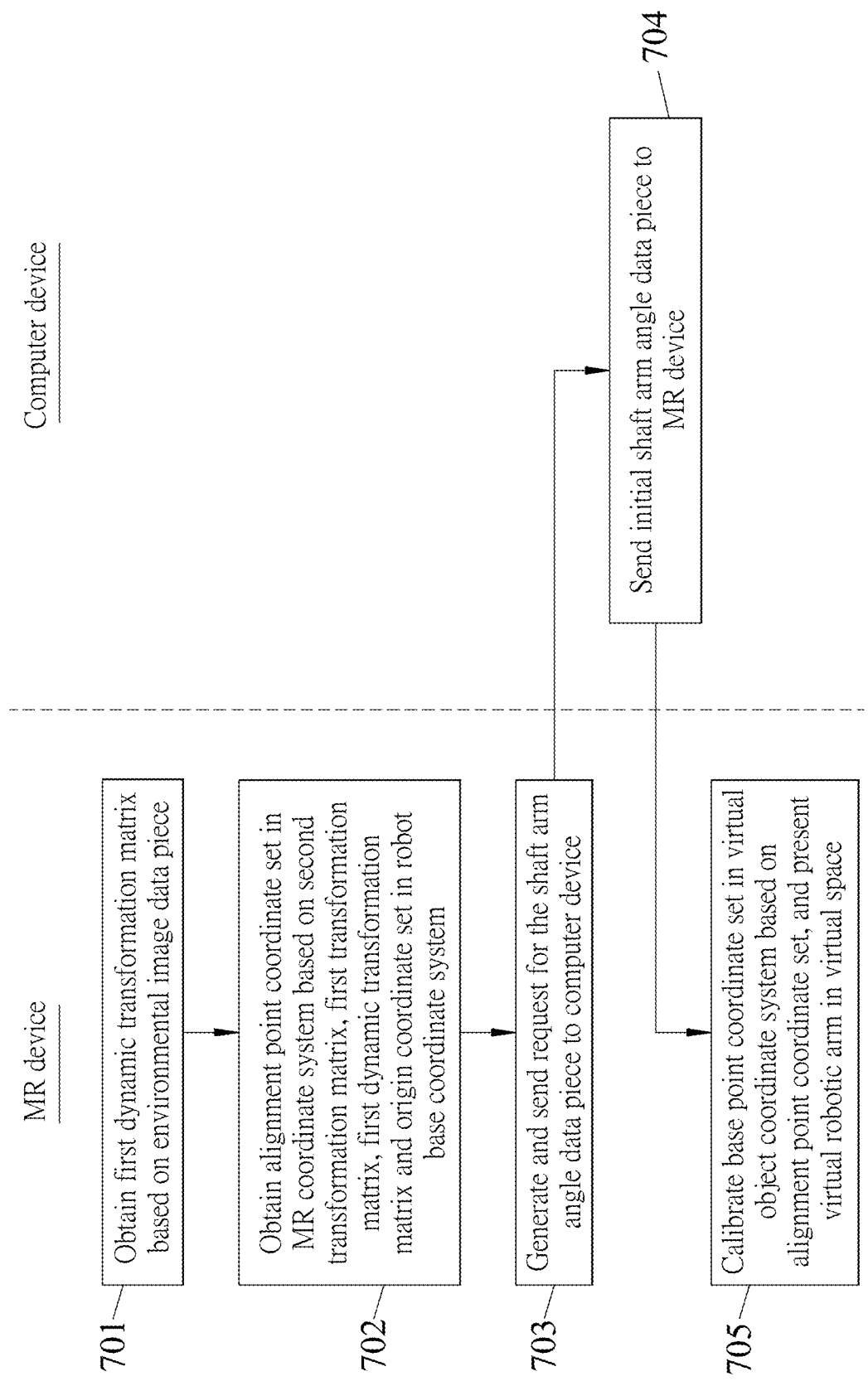
FIG. 12 is a flow chart illustrating steps for presenting/displaying the virtual robotic arm in the virtual space according to the embodiment of the method.
Figure 13:
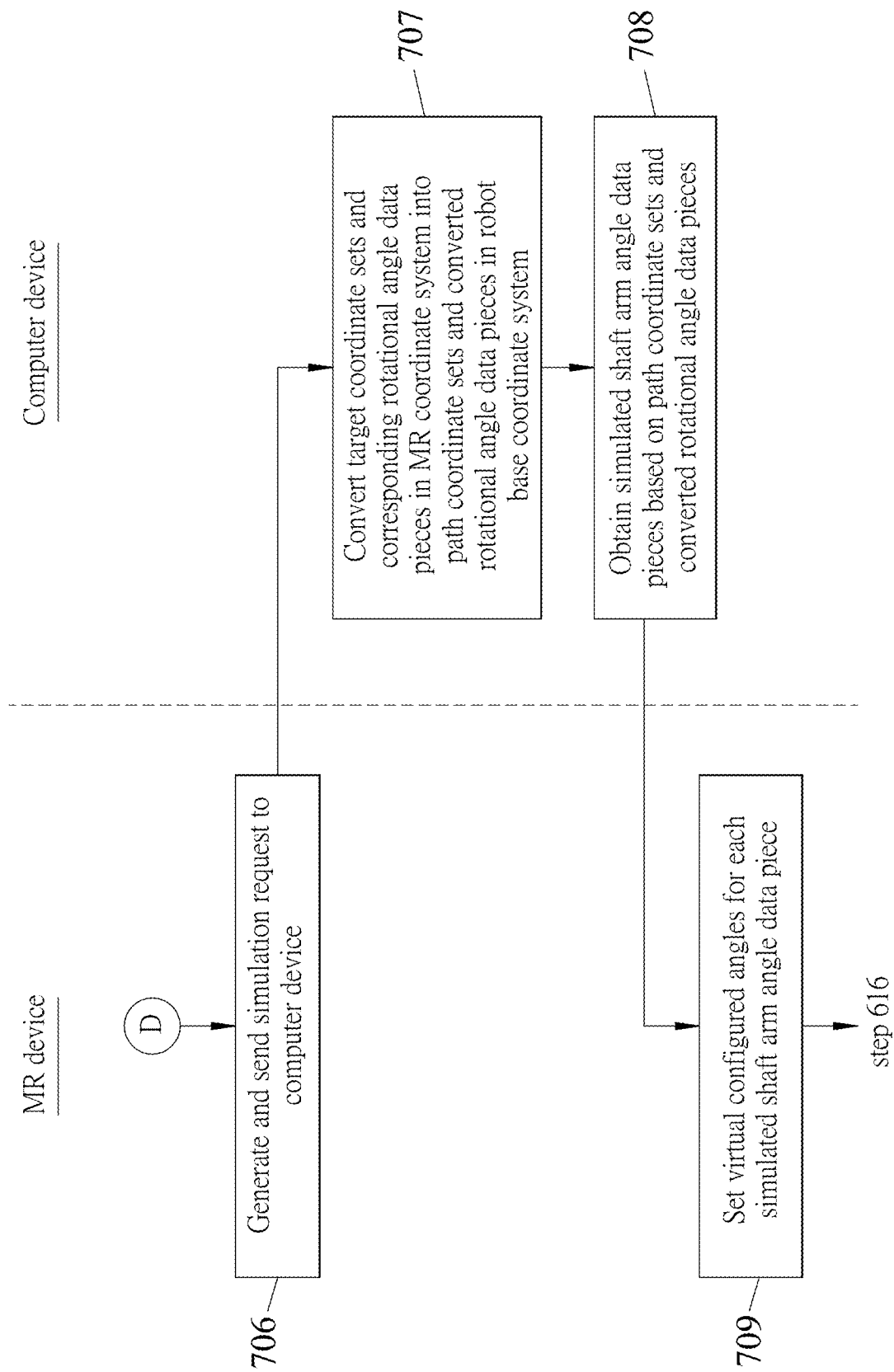
FIG. 13 is a flow chart illustrating steps of a simulation procedure according to the embodiment of the method.

Referring to FIGS. 1, 12 and 13, steps 701 to 705 are preparation steps for the simulation procedure, and the simulation procedure includes steps 706 to 709.

In step 701, the MR device 12 acquires an environmental image data piece that is related to the surrounding environment, and obtains, based on the environmental image data piece, a first dynamic transformation matrix $T_{MRCS}^{WCS}$ that is used to perform coordinate transformation from the MR coordinate system to the world coordinate system. It is noted that the first dynamic transformation matrix $T_{MRCS}^{WCS}$ may be periodically generated and updated by a software program built in the MR device 12 (e.g., the Microsoft HoloLens 2 in this embodiment) based on a position of the MR device 12 in the world coordinate system, and details thereof are omitted herein for the sake of brevity.

In step 702, the MR device 12 obtains an alignment point coordinate set in the MR coordinate system based on the second transformation matrix $T_{NCS}^{MRCS}$, the first transformation matrix $T_{RBCS}^{NCS}$, the first dynamic transformation matrix $T_{MRCS}^{WCS}$, and a coordinate set of an origin (referred to as "origin coordinate set" hereinafter) in the robot base coordinate system. In this embodiment, the origin coordinate set corresponds to the central point of the fixed end 211 of the robotic arm 2, but this disclosure is not limited to such.

Figure 14:
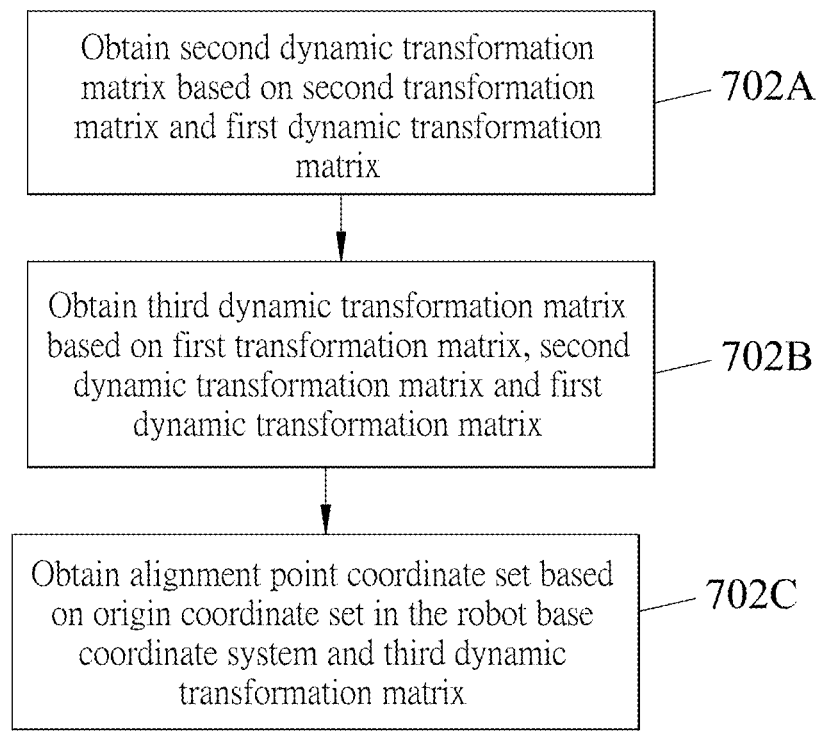
FIG. 14 is a flow chart illustrating steps for obtaining an alignment point coordinate set according to the embodiment of the method.

Further referring to FIG. 14, step 702 includes sub-steps 702A to 702C.

In sub-step 702A, the MR device 12 obtains, based on the second transformation matrix $T_{NCS}^{MRCS}$ and the first dynamic transformation matrix $T_{MRCS}^{WCS}$, a second dynamic transformation matrix $T_{NCS}^{WCS}$ that is used to perform coordinate transformation from the navigation coordinate system to the world coordinate system. The second dynamic transformation matrix $T_{NCS}^{WCS}$ is obtained according to:

$$T_{NCS}^{WCS} = T_{MRCS}^{WCS} \cdot T_{NCS}^{MRCS}. \quad (3)$$

In sub-step 702B, the MR device 12 obtains, based on the first transformation matrix $T_{RBCS}^{NCS}$, the second dynamic transformation matrix $T_{NCS}^{WCS}$ and the first dynamic transformation matrix $T_{MRCS}^{WCS}$, a third dynamic transformation matrix $T_{RBCS}^{MRCS}$ that is used to perform coordinate transformation from the robot base coordinate system to the MR coordinate system. The $T_{RBCS}^{MRCS}$ is obtained according to:

$$T_{RBCS}^{MRCS} = \left(T_{MRCS}^{WCS}\right)^{-1} \cdot T_{NCS}^{WCS} \cdot T_{RBCS}^{NCS}. \quad (4)$$

In sub-step 702C, the MR device 12 obtains the alignment point coordinate set based on the origin coordinate set in the robot base coordinate system and the third dynamic transformation matrix $T_{RBCS}^{MRCS}$. The alignment point coordinate set is obtained according to:

$$T_{origin}^{MRCS} = T_{RBCS}^{MRCS} \cdot T_{origin}^{RBCS}, \quad (5)$$

where $T_{origin}^{MRCS}$ represents the alignment point coordinate set in the MR coordinate system, and $T_{origin}^{RBCS}$ represents the origin coordinate set in the robot base coordinate system In step 703, the MR device 12 generates and sends, to the computer device 11, a request for the joint angle data piece.

In step 704, upon receipt of the request for the joint angle data piece through the communication module 111, the processing module 113 sends an initial joint angle data piece to the MR device 12, where the initial joint angle data piece includes a plurality of configured angles that correspond to the links 21 of the robotic arm 2.

In step 705, upon receipt of the initial joint angle data piece, the MR device 12 uses the initial joint angle data piece as the joint angle data piece, calibrates the base point coordinate set in the virtual object coordinate system based on the alignment point coordinate set in the MR coordinate system, and presents the virtual robotic arm 52 in the virtual space in such a way that the virtual fixed end 5211 of the virtual robotic arm 52 is located at the alignment point coordinate set, and that a plurality of virtual configured angles that correspond to the virtual links 521 are respectively set equal to the configured angles included in the initial joint angle data piece.

In the preparation steps 701 to 705, the virtual robotic arm 52 is set up based on the initial joint angle data piece to simulate a current state of the robotic arm 2 in the real world, and is presented in a manner of overlapping the robotic arm 2 in the mixed reality space (i.e., the combination of the virtual space and the real world) in advance to receiving the instruction for simulating the currently planned path. When the MR device 12 determines in step 615 that the instruction for simulating the currently planned path is received, the flow goes to step 706.

In step 706, the MR device 12 generates and sends a simulation request to the computer device 11. The simulation request includes the target coordinate sets that are obtained respectively in multiple executions of step 606 and that are arranged in a user-defined order. In this embodiment, the user-defined order is a chronological order in which the target coordinate sets are obtained, but this disclosure is not limited in this respect.

In step 707, upon receipt of the simulation request through the communication module 111, the processing module 113 converts, based on the first transformation matrix $T_{RBCS}^{NCS}$ and the second transformation matrix $T_{NCS}^{MRCS}$ target coordinate sets in the MR coordinate system and the corresponding rotational angle data pieces respectively to path coordinate sets and converted rotational angle data pieces that respectively correspond to the path coordinate sets in the robot base coordinate system. The path coordinate sets are arranged in the user-defined order and cooperatively indicate a simulation path for the virtual robotic arm 52. The path coordinate sets and the corresponding converted rotational angle data pieces are obtained according to:

$$T_{target}^{RBCS} = \left(T_{RBCS}^{NCS}\right)^{-1} \cdot \left(T_{NCS}^{MRCS}\right)^{-1} \cdot T_{target}^{MRCS}, \quad (6)$$

where $T_{target}^{RBCS}$ represents the path coordinate sets and the corresponding converted rotational angle data pieces in the robot base coordinate system, and $T_{target}^{MRCS}$ represents the target coordinate sets and the corresponding rotational angle data pieces in the MR coordinate system.

In step 708, the processing module 113 obtains, based on the path coordinate sets and the converted rotational angle data pieces obtained in step 707, a plurality of simulated joint angle data pieces to be used when the virtual non-fixed end 5212 of the virtual robotic arm 52 is to move along the simulation path, and sends the simulated joint angle data pieces to the MR device 12. Each of the simulated joint angle data pieces includes a plurality of simulated angles that respectively correspond to the virtual links 521.

In step 709, upon receipt of the simulated joint angle data pieces, the MR device 12 sets, for each of the simulated joint angle data pieces, the virtual configured angles based on the simulated joint angle data piece, and makes the virtual non-fixed end 5212 of the virtual robotic arm 52 move along the simulation path based on the virtual configured angles that are set for the simulated joint angle data pieces, as shown in FIG. 10, where the virtual robotic arm 52 moves in the virtual space but the robotic arm 2 does not move in the real world. Then, the flow goes back to step 616. After the MR device 12 determines in step 616 that the instruction for terminating path planning is received, the user is able to operate the MR device 12 to perform the execution procedure.

Figure 15:
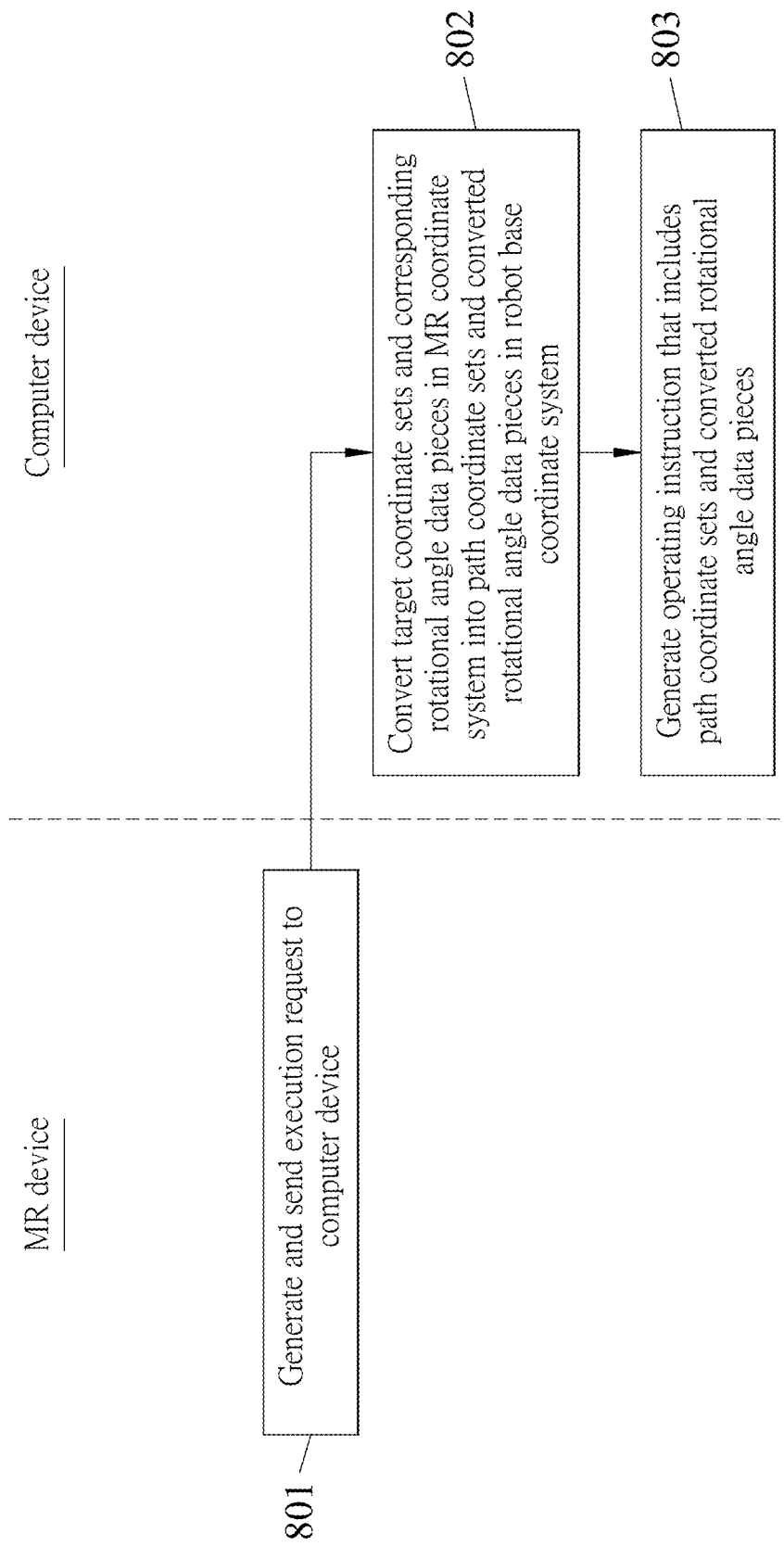
FIG. 15 is a flow chart illustrating steps of an execution procedure according to the embodiment of the method.

Referring to FIGS. 1 and 15, the execution procedure includes steps 801 through 803.

In step 801, the MR device 12 generates and sends an execution request to the computer device 11. The execution request includes the target coordinate sets that are obtained respectively in multiple executions of step 616 and that are arranged in the user-defined order.

In step 802, upon receipt of the execution request through the communication module 111, the processing module 113 converts, based on the first transformation matrix $T_{RBCS}^{NCS}$ and the second transformation matrix $T_{NCS}^{MRCS}$, the target coordinate sets in the MR coordinate system and the corresponding rotational angle data pieces respectively to the path coordinate sets and the converted rotational angle data pieces that respectively correspond to the path coordinate sets in the robot base coordinate system. The path coordinate sets are arranged in the user-defined order and cooperatively indicate a movement path for the robotic arm 2. The path coordinate sets and the converted rotational angle data pieces can be obtained according to the aforementioned equation (6).

In step 803, the processing module 113 generates an operating instruction that includes the path coordinate sets and the converted rotational angle data pieces, and sends the operating instruction to the robotic arm 2, thereby controlling the non-fixed end 212 of the robotic arm 2 to move along the movement path as indicated by the path coordinate sets.

To sum up, the method according to the embodiment of this disclosure uses the MR device 12 to generate the target coordinate sets when the user performs the first gesture (e.g., a gesture of pinch), and to adjust one or more to-be-adjusted target coordinate sets and the corresponding rotational angle data piece(s) when the user performs the second gesture (e.g., a gesture of grasp) on one or more of the to-be-adjusted target coordinate sets individually (e.g., when the user grasps virtual 3D object(s) located at the to-be-adjusted target coordinate set(s) one by one). As a result, the user can generate the operating instruction by wearing the MR device 12 and performing simple gestures. Furthermore, the method enables the user to check whether the planned path is accurate by causing the virtual robotic arm 52 to move along the simulation path in the virtual space.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for planning a movement path for a non-fixed end of a robotic arm, the robotic arm having a fixed end that is opposite to the non-fixed end and that is fixed to a base, the method comprising:

providing a robotic arm control system that is communicatively connected to a camera device which is configured to capture images of the base, wherein the robotic arm control system includes:
a mixed reality (MR) device that is to be worn on a user; and
a computer device that is communicatively connected to the robotic arm and the MR device, and that stores a first transformation matrix and a second transformation matrix,
the first transformation matrix being used to perform coordinate transformation from a robot base coordinate system related to the fixed end of the robotic arm to a navigation coordinate system related to the camera device,
the second transformation matrix being used to perform coordinate transformation from the navigation coordinate system to an MR coordinate system related to the MR device;
the method further comprising:
A) by the MR device, capturing a target-setting hand image that is related to a hand of the user, and obtaining a target coordinate set in the MR coordinate system based on the target-setting hand image, where the target coordinate set is related to the hand of the user;
B) by the MR device, determining whether an instruction for terminating path planning is received;
C) by the MR device, repeating step A) upon determining that the instruction for terminating path planning has not been received yet;
D) by the MR device, after determining that the instruction for terminating path planning is received, generating and sending an execution request to the computer device, the execution request including the target coordinate sets that are obtained respectively in multiple executions of step A) and that are arranged in a user-defined order;

E) by the computer device, upon receipt of the execution request, converting, based on the first transformation matrix and the second transformation matrix, the target coordinate sets in the MR coordinate system respectively to path coordinate sets in the robot base coordinate system, the path coordinate sets being arranged in the user-defined order and cooperatively indicating a movement path; and F) by the computer device, controlling the non-fixed end of the robotic arm to move along the movement path by generating and sending to the robotic arm an operating instruction that includes the path coordinate sets.

2. The method as claimed in claim 1, wherein step A) includes:

A-1) by the MR device, capturing a user-hand image, which is an image of the hand of the user, and acquiring a plurality of hand node coordinate sets in the MR coordinate system based on the user-hand image, the hand node coordinate sets being related to a plurality of hand nodes of the hand, respectively;

A-2) by the MR device, determining whether a first portion of the hand node coordinate sets indicates a first gesture; and A-3) by the MR device, upon determining that the first portion of the hand node coordinate sets indicates the first gesture, making the user-hand image serve as the target-setting hand image, and acquiring the target coordinate set based on the first portion of the hand node coordinate sets.

3. The method as claimed in claim 2, wherein:

in sub-step A-1), the hand node coordinate sets include a first fingertip coordinate set that corresponds to a first fingertip of the hand, and a second fingertip coordinate set that corresponds to a second fingertip of the hand;

in sub-step A-2), the first portion of the hand node coordinate sets includes the first fingertip coordinate set and the second fingertip coordinate set, and the MR device determines whether the first portion of the hand node coordinate sets indicates the first gesture by determining whether a distance between the first fingertip coordinate set and the second fingertip coordinate set is smaller than a first predetermined distance; and in sub-step A-3), the target coordinate set is one of the first fingertip coordinate set and the second fingertip coordinate set.

4. The method as claimed in claim 3, wherein:

sub-step A-1) further includes, by the MR device, acquiring a hand rotational angle data piece based on the target-setting hand image, the hand rotational angle data piece being related to the hand of the user and corresponding to the hand node coordinate sets;

sub-step A-3) further includes, by the MR device, upon determining that the first portion of the hand node coordinate sets indicates the first gesture, storing a rotational angle data piece that corresponds to the target coordinate set, the rotational angle data piece including a pitch angle, a yaw angle and a roll angle with respect to the MR coordinate system; and said method further comprises:

G) by the MR device, determining whether a second portion of the hand node coordinate sets indicates a second gesture that is different from the first gesture upon determining in sub-step A-2) that the first portion of the hand node coordinate sets does not indicate the first gesture, the second portion of the hand node coordinate sets including a reference node coordinate set;

H) by the MR device, upon determining in step G) that the second portion of the hand node coordinate sets indicates the second gesture, determining whether at least one target coordinate set has been obtained;

I) by the MR device, determining whether the at least one target coordinate set includes a to-be-adjusted coordinate set upon determining in step H) that at least one target coordinate set has been obtained, where a distance between the to-be-adjusted coordinate set and the reference node coordinate set is smaller than a second predetermined distance and is a minimum of all distance(s) each between the reference node coordinate set and a corresponding one of the at least one target coordinate set;

J) by the MR device, upon determining in step I) that the at least one target coordinate set includes the to-be-adjusted coordinate set, determining whether a first angle adjustment data piece is found in the MR device, the first angle adjustment data piece being used to update the rotational angle data piece that corresponds to the to-be-adjusted coordinate set;

K) by the MR device, upon determining in step J) that the first angle adjustment data piece is not found in the MR device, making the hand rotational angle data piece serve as the first angle adjustment data piece, and performing step B);

L) by the MR device, upon determining in step J) that the first angle adjustment data piece is found in the MR device, making the hand rotational angle data piece serve as the second angle adjustment data piece;

M) by the MR device, updating the to-be-adjusted coordinate set based on the reference node coordinate set, and updating the rotational angle data piece that corresponds to the to-be-adjusted coordinate set based on the first angle adjustment data piece and the second angle adjustment data piece, followed by deleting the second angle adjustment data piece, and performing step B); and N) by the MR device, deleting the first angle adjustment data piece and the second angle adjustment data piece upon determining in step G) that the second portion of the hand node coordinate sets does not indicate the second gesture.

5. The method as claimed in claim 4, wherein the hand node coordinate sets further include a hand joint coordinate set indicating a joint of the hand, and a wrist joint coordinate set indicating a wrist joint of the hand, the second portion of the hand node coordinate sets includes the hand joint coordinate set, the wrist joint coordinate set and the second fingertip coordinate set; and wherein step G) includes:

G-1) acquiring a first vector based on the hand joint coordinate set and the wrist joint coordinate set;

G-2) acquiring a second vector based on the hand joint coordinate set and the second fingertip coordinate set; and G-3) determining whether the second portion of the hand node coordinate sets indicates the second gesture by determining whether an angle between the first vector and the second vector is smaller than a predetermined angle.

6. The method as claimed in claim 4, wherein the MR device stores a virtual three-dimensional (3D) object;
   wherein sub-step A-3) further includes presenting, based on the target coordinate set and the rotational angle data piece that corresponds to the target coordinate set, the virtual 3D object in a virtual space defined by the MR coordinate system; and
   wherein step M) further includes presenting the virtual 3D object in the virtual space based on the to-be-adjusted coordinate set that has been updated and the rotational angle data piece that corresponds to the to-be-adjusted coordinate set and that has been updated.

7. The method as claimed in claim 1, wherein the base includes a first positioning label, and the robotic arm control system further includes a second positioning label disposed to be captured by the camera device and the MR device; and
   wherein the computer device stores a third transformation matrix that is used to perform coordinate transformation from the robot base coordinate system to a first positioning coordinate system defined by the first positioning label;
   said method further comprising, before step A):
      i) by the computer device, upon receipt of a first image that is captured by the camera device and that includes the first positioning label, obtaining the first transformation matrix based on the first image and the third transformation matrix, and sending the first transformation matrix to the MR device; and
      ii) by the computer device, upon receipt of a second image and a third image, obtaining the second transformation matrix based on the second image and the third image, and sending the second transformation matrix to the MR device, where the second image is captured by the camera device and includes the second positioning label, and the third image is captured by the MR device and includes the second positioning label.

8. The method as claimed in claim 7, wherein step i) includes:
   i-1) obtaining, based on a first-positioning-label region that is in the first image and that is related to the first positioning label, a label-based transformation matrix that is used to perform coordinate transformation from the first positioning coordinate system to the navigation coordinate system; and
   i-2) obtaining the first transformation matrix based on the third transformation matrix and the label-based transformation matrix, and sending the first transformation matrix to the MR device.

9. The method as claimed in claim 7, wherein step ii) includes:
   ii-1) obtaining, based on a second-positioning-label region that is in the second image and that is related to the second positioning label, a first label-based transformation matrix that is used to perform coordinate transformation from a second positioning coordinate system that is defined by the second positioning label to the navigation coordinate system;
   ii-2) obtaining, based on another second-positioning-label region that is in the third image and that is related to the second positioning label, a second label-based transformation matrix that is used to perform coordinate transformation from the second positioning coordinate system to the MR coordinate system; and
   ii-3) obtaining the second transformation matrix based on the first label-based transformation matrix and the second label-based transformation matrix, and sending the second transformation matrix to the MR device.

10. The method as claimed in claim 7, wherein the robotic arm includes a plurality of links, one of the links having the fixed end of the robotic arm, and another one of the links having the non-fixed end of the robotic arm;
    wherein the MR device stores a world coordinate system, and a virtual robotic arm that has a same structure as the robotic arm and that is used in a virtual object coordinate system to simulate motion of the robotic arm based on a joint angle data piece; and
    wherein the virtual robotic arm includes a plurality of virtual links, one of the virtual links including a virtual fixed end of the virtual robotic arm that corresponds to the fixed end of the robotic arm and that is located at a base point coordinate set in the virtual object coordinate system, another one of the virtual links including a virtual non-fixed end that corresponds to the non-fixed end of the robotic arm and that is opposite to the virtual fixed end;
    said method further comprising:
       G) by the MR device, obtaining an environmental image data piece that is related to a surrounding environment, and obtaining, based on the environmental image data piece, a first dynamic transformation matrix that is used to perform coordinate transformation from the MR coordinate system to the world coordinate system;
       H) by the MR device, obtaining an alignment point coordinate set in the MR coordinate system based on the second transformation matrix, the first transformation matrix, the first dynamic transformation matrix, and a coordinate set of an origin in the robot base coordinate system;
       I) by the MR device, generating and sending to the computer device a request for the joint angle data piece;
       J) by the computer device, upon receipt of the request for the joint angle data piece, sending an initial joint angle data piece to the MR device, where the initial joint angle data piece includes a plurality of configured angles that correspond to the links of the robotic arm; and
       K) by the MR device, upon receipt of the initial joint angle data piece, using the initial joint angle data piece as the joint angle data piece, calibrating the base point coordinate set in the virtual object coordinate system based on the alignment point coordinate set in the MR coordinate system, and presenting the virtual robotic arm in a virtual space defined by the MR coordinate system in such a way that the virtual fixed end of the virtual robotic arm is located at the alignment point coordinate set, and that a plurality of virtual configured angles that correspond to the virtual links are respectively set to equal the configured angles included in the initial joint angle data piece.

11. The method as claimed in claim 10, wherein step H) includes:
    H-1) obtaining, based on the second transformation matrix and the first dynamic transformation matrix, a second dynamic transformation matrix that is used to perform coordinate transformation from the navigation coordinate system to the world coordinate system;
    H-2) obtaining, based on the first transformation matrix, the second dynamic transformation matrix and the first dynamic transformation matrix, a third dynamic transformation matrix that is used to perform coordinate transformation from the robot base coordinate system to the MR coordinate system; and H-3) obtaining the alignment point coordinate set based on the coordinate set of the origin in the robot base coordinate system and the third dynamic transformation matrix.

12. The method as claimed in claim 10, further comprising, before step B):

L) by the MR device, determining whether an instruction for simulating a currently planned path is received;

M) by the MR device, upon determining in step L) that the instruction for simulating a currently planned path is not received, performing step B);

N) by the MR device, upon determining in step L) that the instruction for simulating a currently planned path is received, generating and sending a simulation request to the computer device, the simulation request including the target coordinate sets that are obtained respectively in the multiple executions of step A) and that are arranged in the user-defined order;

O) by the computer device, upon receipt of the simulation request, converting, based on the first transformation matrix and the second transformation matrix, the target coordinate sets in the MR coordinate system respectively to the path coordinate sets in the robot base coordinate system, the path coordinate sets being arranged in the user-defined order and cooperatively indicating a simulation path;

P) by the computer device, obtaining, based on the path coordinate sets obtained in step O), a plurality of simulated joint angle data pieces to be used when the virtual non-fixed end of the virtual robotic arm is to move along the simulation path, each of the simulated joint angle data pieces including a plurality of simulated angles that respectively correspond to the virtual links; and Q) by the MR device, setting, for each of the simulated joint angle data pieces, the virtual configured angles based on the simulated joint angle data piece, and making the virtual non-fixed end of the virtual robotic arm move along the simulation path based on the virtual configured angles that are set for the simulated joint angle data pieces, followed by performing step B).

* * * * *